W. H. MIZE.
WHEELED SECTIONAL HARROW.
APPLICATION FILED JAN. 12, 1918.

1,272,294.

Patented July 9, 1918.
2 SHEETS—SHEET 1.

WITNESSES

INVENTOR
W. H. Mize
BY Victor J. Evans
ATTORNEY

UNITED STATES PATENT OFFICE.

WILLIAM H. MIZE, OF CELINA, TEXAS.

WHEELED SECTIONAL HARROW.

1,272,294.

Specification of Letters Patent.

Patented July 9, 1918.

Application filed January 12, 1918. Serial No. 211,598.

*To all whom it may concern:*

Be it known that I, WILLIAM H. MIZE, a citizen of the United States, residing at Celina, in the county of Collin and State of Texas, have invented new and useful Improvements in Wheeled Sectional Harrows, of which the following is a specification.

The invention is an improved wheeled sectional harrow, the object of the invention being to provide an improved harrow of this type which is simple in construction; another specific object being to provide means to raise and lower the harrow sections as required, another object being to effect improvements in the construction of the truck which carries the harrow sections.

The invention consists in the construction, combination and arrangement of devices hereinafter described and claimed.

In the accompanying drawings:—

Figure 1:
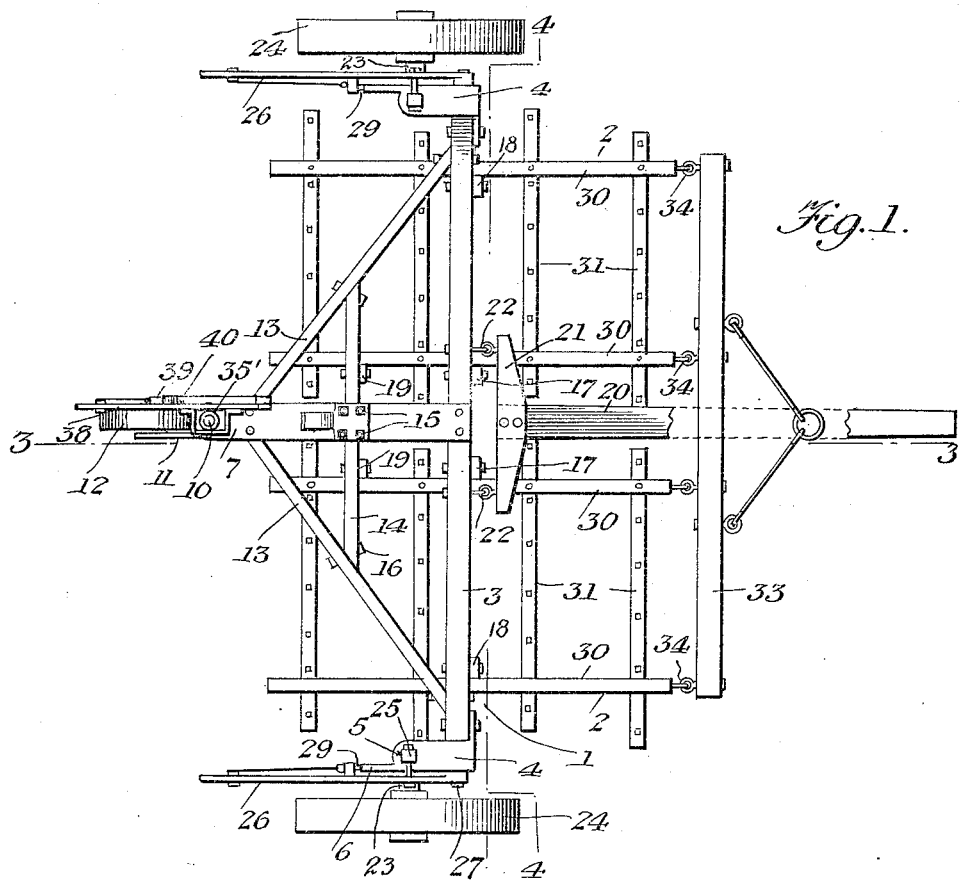
Figure 1 is a plan of a wheeled sectional harrow constructed and arranged in accordance with my invention.
Figure 2:
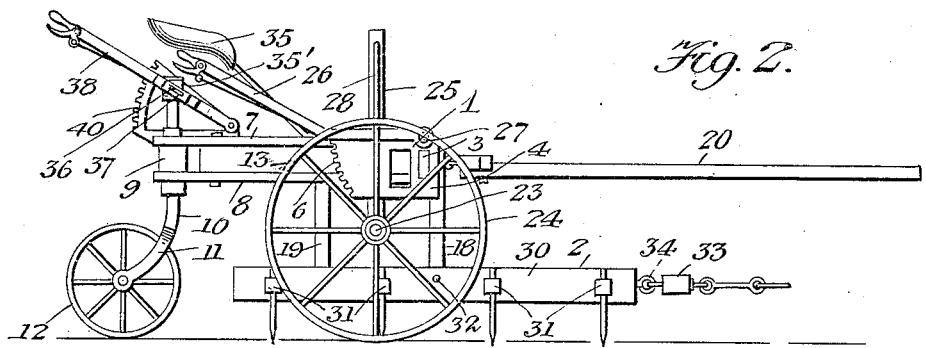
Fig. 2 is an elevation of the same.
Figure 3:
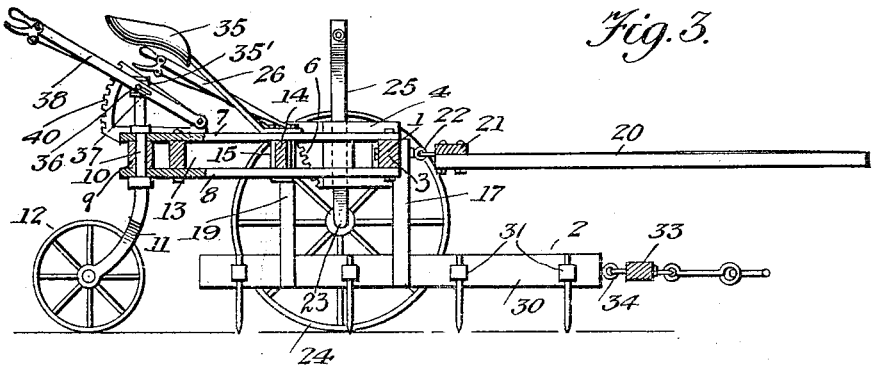
Fig. 3 is a longitudinal sectional view of the same, on the plane indicated by the line 3—3 of Fig. 1.
Figure 4:
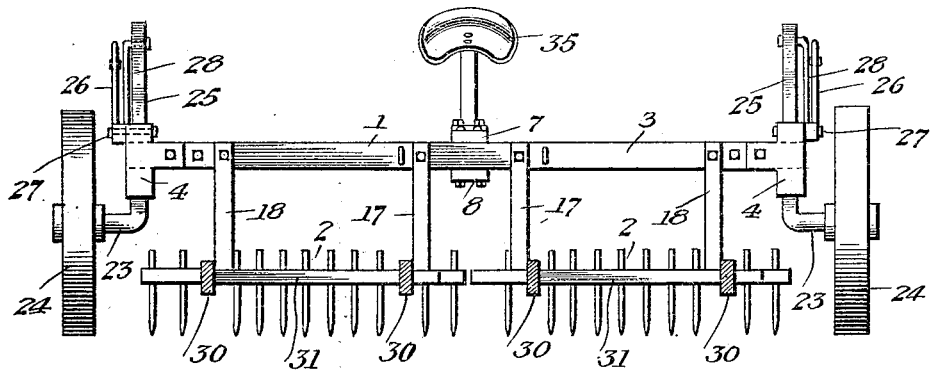
Fig. 4 is a vertical transverse sectional view of the same, on the plane indicated by the line 4—4 of Fig. 1.

My improved harrow embodies a truck 1 and harrow sections which are carried by the truck. The front side of the truck is formed by an axle bar 3 which has rearwardly extending brackets 4 at its ends each of which has a vertical guide-way 5 and also has, at the rear side, a segment 6. Bars 7, 8 have their front ends respectively bolted to the upper and lower sides of the axle bar, at the center of the latter, said bars 7, 8 extending rearwardly from the axle bar and being provided between their rear ends with a block 9 which has a vertical socket opening for the spindle 10 of a fork 11 in which fork a trailing wheel 12 is mounted. A sleeve 35' is swivelly mounted on the upper end of the spindle 10 and is provided with an outstanding pin 36 which engages in a slot 37 of a lever 38. Said lever is for raising and lowering the spindle, and is provided with a locking dog which coacts with a segment 40 to secure the lever in any desired adjusted position and hence correspondingly secure the spindle 10. A pair of rearwardly converging bars 13 have their front ends bolted to the axle bar 3 and their rear ends bolted together and secured between the bars 7, 8. A cross-bar 14 is arranged and secured between the bars 7, 8 by U-bolts 15 and has its ends bolted to the inner sides of the bars 13, as at 16. Standards 17 are bolted at their upper ends to the axle bar at points near the center of the latter and standards 18 have their upper ends bolted to the axle bar at points a suitable distance from the outer ends thereof. Standards 19 which are arranged in line with the standards 17 have their upper ends secured to the cross-bar 14. A tongue 20 has a cross-bar 21 at its rear end which is pivotally connected to the axle bar 3 as at 22. Axles 23 for ground wheels 24 have vertical arms 25 at their inner ends which operate and are adapted to move vertically in the guides 5 of the brackets 4, said guides and said vertical arms being non-circular in cross section to prevent the axles from turning. Levers 26 for raising and lowering the truck, at either side, are pivotally connected to the brackets 4 as at 27 and are each connected to the vertical arm of one of the axles by a rod 28 so that said levers enable the truck to be raised and lowered at either or both sides as may be required. Each lever is provided with a locking dog 29 to coact with one of the segments to lock the lever in any desired adjusted position.

The harrow sections 2 are here shown as of oblong rectangular form and as each comprising a pair of longitudinally arranged bars 30 and cross-bars 31. The outer bar 30 of each harrow section is pivotally connected, as by means of a bolt 32 with the lower portion of one of the standards 18, the inner bar 30 of each harrow section being arranged on the outer sides of one of the standards 17 and one of the standards 19. Hence the harrow sections are arranged under and connected to the truck and for independent vertical angular movement of the harrow section, to enable the harrow section to accommodate themselves to inequalities of the ground.

A draft-beam 33 to which the team is directly hitched is pivotally connected as at 34 to the front ends of the harrow sections so that the draft is applied directly to the harrow sections. A seat 35 for the driver is secured on the rear portion of the bar 7. The levers which enable either side of the harrow to be raised or lowered may be readily reached and operated by the driver and the harrow may be readily controlled.

While I have herein shown and described a preferred form of my invention, I would have it understood that changes may be made in the form, proportion and construction of the several parts, without departing from the spirit of my invention and within the scope of the appended claim.

Having thus described my invention, I claim:—

In a harrow of the class described, a truck frame comprising an axle bar, upper and lower longitudinally arranged bars secured to and extending rearwardly from the center of the axle bar, rearwardly converging bars having their rear ends secured between said upper and lower bars and having their front ends secured to the axle bar, a cross-bar connecting said rearwardly converging bars, standards extending downwardly from the cross-bar, inner and outer standards extending downwardly from the axle bar, and harrow sections arranged with their inner sides bearing against the inner standards and the standards of the cross-bar and with their outer sides pivotally connected to the outer standards.

In testimony whereof I affix my signature.

WILLIAM H. MIZE.

Copies of this patent may be obtained for five cents each, by addressing the "Commissioner of Patents, Washington, D. C."